March 8, 1949.

S. MYERSON 2,463,549

ARTIFICIAL TOOTH AND METHOD OF UNITING
AN ARTIFICIAL TOOTH TO A TOOTH SUPPORT

Filed July 17, 1948

Inventor
Simon Myerson
by Roberts, Cushman & Grover
Att'ys.

March 8, 1949.  S. MYERSON  2,463,549
ARTIFICIAL TOOTH AND METHOD OF UNITING
AN ARTIFICIAL TOOTH TO A TOOTH SUPPORT
Filed July 17, 1948  2 Sheets-Sheet 2
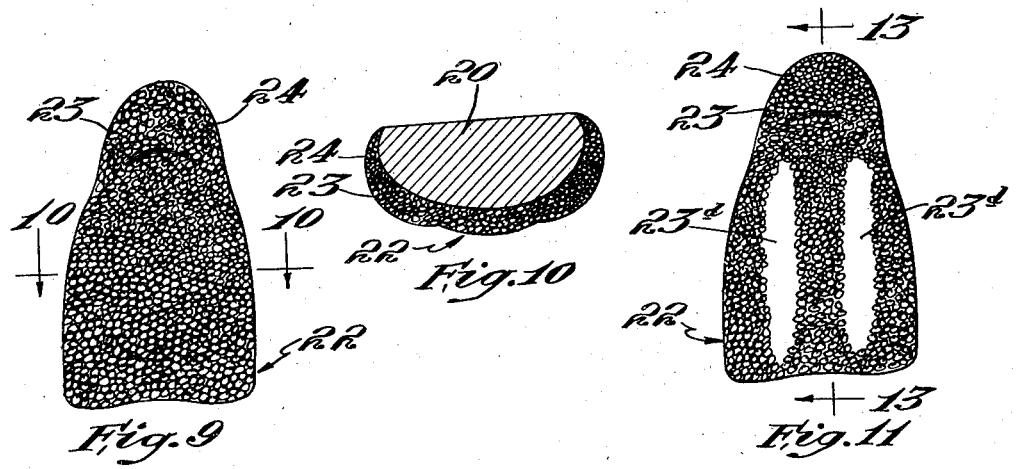
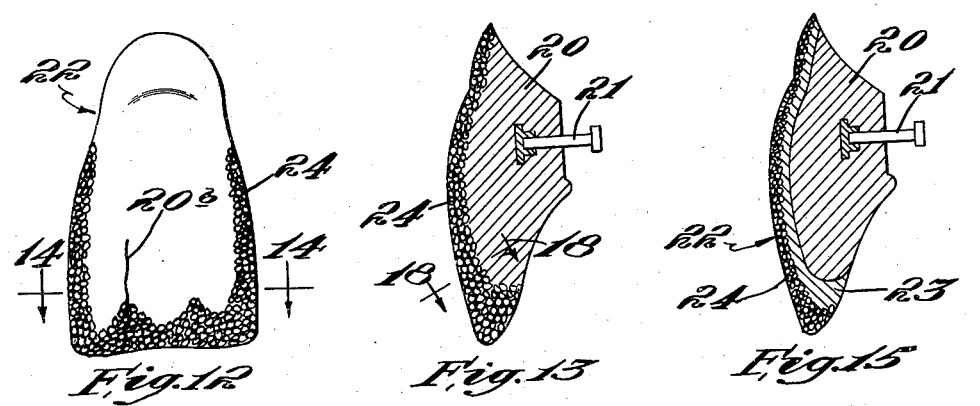
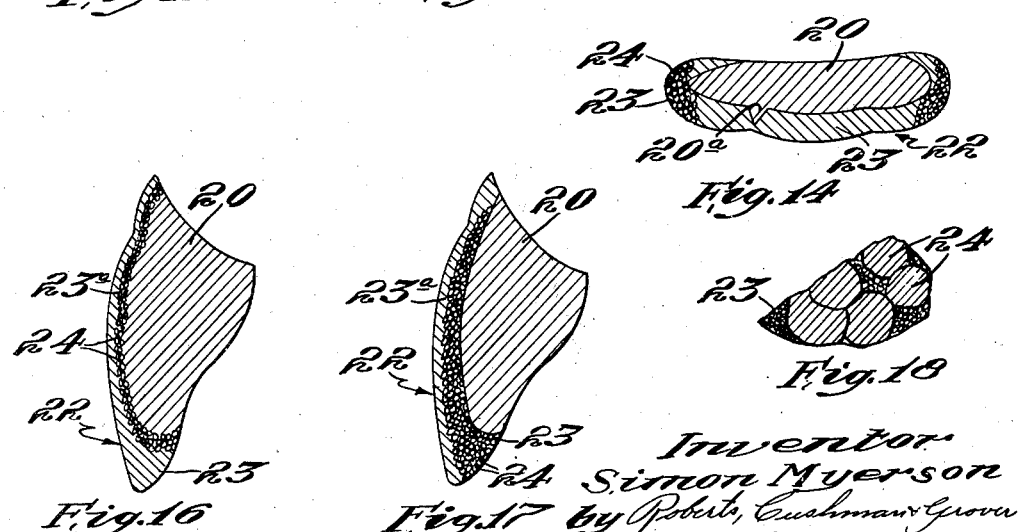
Inventor
Simon Myerson
by Roberts, Cushman & Grover
att'ys.

Patented Mar. 8, 1949

2,463,549

UNITED STATES PATENT OFFICE 2,463,549

ARTIFICIAL TOOTH AND METHOD OF UNITING AN ARTIFICIAL TOOTH TO A TOOTH SUPPORT

Simon Myerson, Brookline, Mass.

Application July 17, 1948, Serial No. 39,258

12 Claims. (Cl. 32—8)

This invention relates to artificial teeth, and to a method of uniting such teeth to a tooth support. This application is a continuation-in-part of my copending applications, Serial Nos. 683,537, filed July 13, 1946, now abandoned and 691,457, filed August 19, 1946, now abandoned.

A denture, as usually made, comprises a support of rigid but mouldable material, for example methyl methacrylate, in which is mounted one or more artificial teeth usually made of ceramic material such as porcelain. The tooth is normally anchored to the unlike material of the support by some form of connecting element, for example a headed pin projecting from the tooth with its head embedded in the material of the support, or by providing the gingival end of the tooth with lateral undercuts or the like. In order to provide a sufficient mass of the denture material to insure firm anchorage of the heads of the pins, it is necessary to make the support thicker and heavier than is desirable lingually of and between the teeth. Moreover, the lingual surface of about the upper two-thirds of the length of the upper tooth and the lower two-thirds of the length of the lower tooth lacks the normal contour of a natural tooth. These disadvantages are well-known and generally acknowledged.

In artificial teeth, as commonly made from ceramic material, the occlusal surfaces of the posterior teeth and the lingual surfaces of the incisors are normally much harder than the corresponding surfaces of natural teeth. Accordingly, the natural teeth of a person who has been provided with artificial teeth in a denture, for example, an upper denture, which are opposed by natural teeth in the lower jaw will wear away at the areas of contact between the natural and the artificial teeth.

In my earlier United States Patents 2,207,712, 2,202,713, 2,230,164 and Reissue 22,331, I have disclosed the provision of a substantially transparent enamel simulating portion and the provision of inserts either integral with or distinct from the body portion to simulate cracks, stains or other irregularities which frequently occur in natural teeth. The substantially transparent enamel simulating portion imparts to the artificial tooth a soft lustre much more closely than that of the prior art. The internal inserts impart other characteristics to further the simulation of the natural tooth. While the manufacture of artificial teeth embodying such improvements has been extensive such teeth fail in many cases at least to achieve certain subtle visual qualities of a natural tooth. One embodiment of this invention consists of a further improvement which simulates even more closely the optical effects of the visible enamel portion of a natural tooth.

Hitherto the basic materials and the pigments, where pigments are used, were mixed and interfused or cured in such a manner as to produce a visually homogeneal surface. The means used to break such homogeneity consisted of painting colors into certain areas of the tooth to simulate defects commonly occurring in natural teeth, or to accomplish a similar result, by inserts such as those disclosed in my United States Patent 2,202,713. By means of one embodiment of the present invention I am able to create a visually heterogeneous surface which more closely resembles the appearance of a natural tooth than has hitherto been possible.

The present invention has for one of its objects the provision of an artificial tooth capable of being securely mounted in a denture and at the same time providing a natural lingual contour of the tooth and of the oral support.

A further object is the provision of an artificial tooth having an occlusal surface which approximates in hardness the hardness of the occlusal surface of a natural tooth.

A further object is the provision of an artificial tooth having a novel and efficient interlocking construction between two or more of the constituent elements of the tooth.

A further object is the provision of an artificial tooth having a novel attaching portion adapted to be easily and securely joined to an oral support.

Another object of the present invention is to provide the enamel simulating portion of an artificial tooth with a plurality of tiny cells which may be filled with a material having different characteristics from the cell-forming material.

Another object is to provide an artificial tooth whose labial surface presents an appearance of dots having visual effects differing from those of the surrounding enamel simulating portion.

Another object is to provide an artificial tooth the labial surface of which presents a variety of optical effects including areas having a stippled effect.

Further objects are to provide an artificial tooth closely simulating the appearance of a natural tooth and such a tooth which may be manufactured by mass production methods.

Other objects are the provision of a novel and efficient artificial tooth and the provision of such a tooth which is capable of economical manufacture.

Another object is the provision of a novel method of uniting an artificial tooth to a tooth support.

In one embodiment of the invention, the body or the dentine-simulating part of the tooth comprises a structure that is honeycombed with communicating cells, and a material filling the said cells. The cell-filling material is preferably of such nature that it will strengthen the tooth, impart resilience to it and, at the same time, be capable of molecular union with the material of the denture base or oral support. For example, today methyl methacrylate is in far greater use than any other material for making denture bases and methyl methacrylate may be used as the cell-filling material and the cell-forming material may be porcelain or other ceramic material.

By cells, I do not mean tiny voids or blebs such as usually and unavoidably occur in the process of manufacturing artificial teeth of porcelain and which occur in considerable numbers in practically all ceramic teeth. Such blebs or voids cannot be utilized for the purposes of this invention. The communicating cells which are purposely created in the tooth of my invention preferably are spherical or nearly spherical in shape although they may be irregular. In some embodiments of the invention many cells are formed so that they open upon a predetermined surface of the tooth in such a manner that the wall of the cell is retentive in form or shape. The substantially spherically shaped cells yield a stronger construction of the cell-forming body than the irregularly shaped cells. A considerable range of sizes of cells may be used, but I have found that to facilitate filling the cells with the desired filling material and especially where cells are located deeply within the tooth, substantially spherical cells of a diameter approximately twenty-five one thousandths of an inch are very satisfactory. Cells of greater or smaller size may, nevertheless, be used. Although I believe uniformity of size of the cells gives a stronger structure, I find that a structure containing a range of sizes of cells having diameters varying from ten one thousandths of an inch to fifty one thousandths of an inch may be employed with excellent results. Compared to the size of the cells the ceramic particles are relatively small, being of the order in common use in the manufacture of artificial teeth. A strong ceramic body containing a sufficient number of communicating cells may be made by thoroughly mixing with the ceramic powder fifty per cent by weight of the methyl methacrylate particles.

Just as the ceramic material forming the intercommunicating spherical cells provides a connected structure so, too, the plastic material filling the intercommunicating cells provides another connected structure and the latter plastic structure may be caused to become integrally and molecularly joined to the denture base.

In one embodiment the gingival area and the adjacent lingual and lateral areas of the tooth may be provided with retentive cells. Preferably these cells are substantially filled with methyl methacrylate or other material which is capable of molecular union with the material of the oral support in which the tooth is to be mounted. Such a tooth is molecularly joined to the oral support during the usual procedure of processing a denture, since the material which fills the retentive cells of that portion of the surface of the tooth which is embedded in the oral support integrally joins and coalesces with the material of the support.

Another embodiment of the invention includes the provision of such retentive cells at, and opening upon, the occlusal surface of posterior teeth and the lingual surface of anterior teeth, the cells being substantially filled with a material, for instance, a synthetic resin which is softer than the ceramic material in which the cells are formed. This provides a tooth with a softer biting surface and prevents undue wearing away of the biting surfaces of natural teeth with which the artificial teeth contact. In case of teeth which are made entirely of plastic material, the member having cells formed therein may be thermosetting while the element filling said cells may be thermoplastic.

In accordance with one embodiment of this invention I provide the enamel simulating portion of an artificial tooth, and preferably the exposed labial surface thereof, with a plurality of tiny cells adapted to be filled with a material which has different visual characteristics from the cell-forming material thereby producing an optically heterogeneous tooth surface. Moreover by appropriately locating the cells in various portions of the enamel simulating portion many of the variations of appearance which occur in natural teeth may be simulated.

When the cells are utilized to control the appearance of the enamel simulating portion of the tooth the diameter or width of the cells may range from five one thousandths (.005) of an inch to fifteen one thousandths (.015) of an inch; in other instances for special effects in the enamel simulating portion the diameter or width may be as great as twenty-five one thousandths (.025) of an inch.

Other and further objects and advantages of the invention will be pointed out hereafter in the following more detailed description and by reference to the accompanying drawings in which Fig. 1 is a front elevation of an artificial tooth;

Fig. 9 is an enlarged labial face view of an artificial tooth illustrating another embodiment of my invention, the cells being enlarged for purposes of illustration;

Fig. 10 is an enlarged section on the line 10—10 of Fig. 9;

Fig. 11 is an enlarged labial face view of an artificial tooth illustrating another embodiment of my invention; the cells being enlarged for purposes of illustration;

Fig. 12 is an enlarged labial face view of an artificial tooth illustrating another embodiment of my invention, the cells being enlarged for purposes of illustration;

Fig. 13 is a section on the line 13—13 of Fig. 11;

Fig. 14 is an enlarged section on the line 14—14 of Fig. 12;

Fig. 15 is a section similar to Fig. 13 showing a tooth of slightly modified construction;

Fig. 16 is a labio-lingual vertical section illustrating an artificial tooth provided with another embodiment of the invention;

Fig. 17 is a section similar to Fig. 16 showing a slightly different embodiment; and Fig. 18 is an enlarged fragmentary section on the line 18—18 of Fig. 5.

Figure 2:
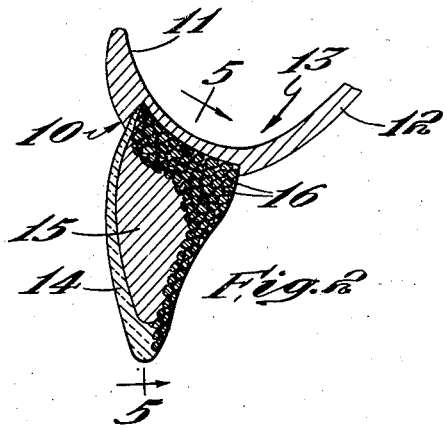
Fig. 2 is a labio-lingual vertical section showing an artificial tooth illustrating two embodiments of the invention.
Figure 5:
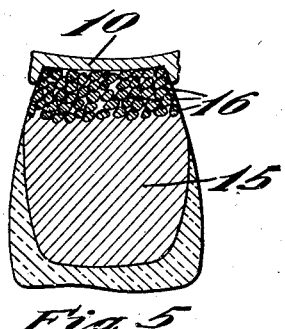
Fig. 5 is a section on the line 5—5 of Fig. 2.

Referring to Figs. 2 and 5 of the drawings, the numeral 10 designates a portion of an oral support, in this case an upper plate, which is made of any suitable material, for example a synthetic resin such as methyl methacrylate. The forward portion 11, in use, is disposed at the labial surface of the gum ridge, and the rear portion 12 is designed to engage the surface of the palate, these two portions merging to form the channel 13 for the reception of the crest of the gum ridge.

The artificial tooth illustrated in Fig. 2 consists of three elements; the enamel simulating portion 14 which may be of any desired material, for example porcelain; the body portion 15 which may also be made of ceramic material; and the material 16 which substantially fills a multitude of communicating cells which have been provided in the gingival or basal and the lingual portions of the body portion and in the lingual enamel-simulating portion. The material 16 should be of a character such that it will firmly unite (preferably to form a molecular union) with the material of the plate in which the tooth is to be mounted. For example, it may be methyl methacrylate when the tooth is to be utilized in connection with a plate or other oral support of methyl methacrylate. Thus the material at the basal portion of the tooth is capable of molecular union with the material of the support.

The artificial tooth illustrated in Figs. 2 and 5 has been joined to the oral support by molecular union between the material filling the cells at the gingival portion of the tooth and the adjacent material of the oral support. In use the gingival surface of the tooth may be ground to the extent necessary for proper mounting of the tooth, and the tooth may thereafter be joined to the material of the support during the usual process of packing and processing the denture. No loss of retention will be caused by such grinding unless the grinding goes beyond the portion of the body of the tooth in which the cells have been formed. The lingual surface of the tooth presents a combination of plastic and ceramic materials which is softer than a surface composed solely of ceramic material and which therefore reduces wear on the surface of natural teeth which bite against it.

Figure 8:
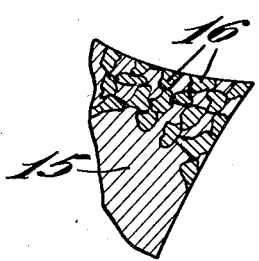
Fig. 8 is an enlarged vertical section of a tooth similar to the tooth illustrated in Fig. 2 except that the cells are irregular in shape.

The network of cells are so formed that they tend to retain the material 16. That is to say, once the material 16 (usually a synthetic resin, herein referred to as a "plastic") is placed therein it engages overhanging surfaces of the cells so that it is practically impossible to remove it. By way of example, the cells may be formed by mixing with the ceramic material (of which the body portion 15 is formed) an organic filler, for example grains of walnut wood, cork, small seeds, or plastic powder, for example a polymer of methyl methacrylate or some material which burns at a very low temperature. After the ceramic material has been moulded and hardened, for example after the formation of a tooth biscuit, the organic particles may be burned out, for instance in firing the ceramic material, or they may be dissolved out by the use of a suitable solvent, e. g. acetone. The substantially spherical cells of Figs. 2 to 7 inclusive may be formed by using the plastic powder and the irregular cells of Fig. 8 may be formed by using grains of walnut wood, cork or the like.

As hereinbefore stated the particles of the ceramic powder are preferably very much smaller than the particles of the cell making material with which they are mixed. When such a mixture is packed within a mould the layer in contact with the mould surface will tend to have numerous openings or passages on said surface, which communicate with cells of larger diameter than the openings or passages and many of the interior cells open and communicate with contiguous cells by similar openings or passages.

The plastic material for filling the cells thus provided (for example methacrylate, polystyrene or the like) may be incorporated within the cells by injecting it thereinto, in accordance with injection moulding procedures as used in the moulding of plastics. Another method of introducing the plastic material into the cells is by the use of a vacuum chamber in which the air is evacuated from the cells and the vacuum is then released while the teeth are immersed in a bath of the plastic material within the chamber. Upon releasing the vacuum, the plastic material is forced into the cells by atmospheric pressure. Additional pressure may be supplied if desired.

The cells in the enamel simulating portion 14 of the tooth may be formed and filled in the same manner as the cells in the body portion 15.

Figure 3:
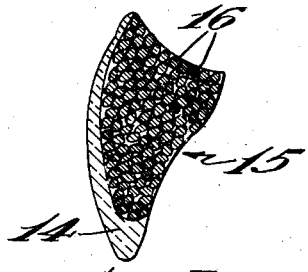
Fig. 3 is a labio-lingual vertical section illustrating an artificial tooth provided with another embodiment of the invention.

In the tooth illustrated in Fig. 3 the body portion 15 is honeycombed with communicating cells and substantially all of the cells are filled with plastic material 16 by one of the methods hereinabove described. The vacuum method is particularly desirable for this type of tooth. Such a tooth may be ground extensively and then used in a denture without loss of its retentiveness to the oral support.

Figure 4:
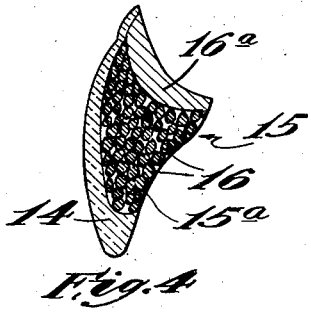
Fig. 4 is a labio-lingual vertical section of an artificial tooth provided with another embodiment of the invention.

In the tooth shown in Fig. 4, the body portion 15 consists of two component sections, the section 15ª made of ceramic material and provided with communicating cells which are substantially filled with plastic material 16, for example methyl methacrylate and the section 16ª made of plastic material, for example methyl methacrylate or polystyrene which is capable of molecular union with the material of which the oral support is constructed and with the material 16. In this instance the cell-filling material 16 serves to unite the sections 15ª and 16ª, and the section 16ª serves to unite the tooth to the oral support. The tooth may be joined to the oral support in the manner described above and any necessary fitting may usually be done by treating (grinding, etc.) the section 16ª.

To produce the tooth of Fig. 4 the cells are formed and filled by one of the methods described above. The section 16ª is then added and molecularly joined to the exposed surface of the plastic material 16 contained in the cells of the body portion by heat and pressure. If the injection method is used, the part is injected at the basal part of the tooth and the sprue is removed after hardening has taken place. If desired the empty cells in the body may be filled and the section 16ª added utilizing the same plastic material in a single injection process.

Figure 6:
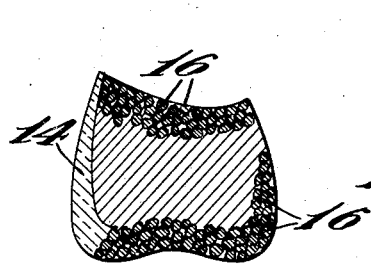
Fig. 6 is a labio-lingual vertical section illustrating two features of the present invention embodied in a posterior tooth.
Figure 7:
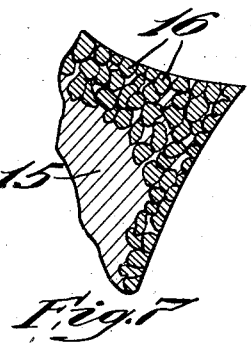
Fig. 7 is an enlarged vertical section of the tooth illustrated in Fig. 2, the cells being generally spherical in shape.

The tooth illustrated in Fig. 6 is a posterior tooth embodying the same principles illustrated in Fig. 2 in which the occlusal surface of the enamel simulating portion 14 of the tooth and the basal portion of the body portion of the tooth are formed with cells filled with softer plastic material 16, and such a tooth may be made as described above.

It will be apparent to persons skilled in the art that certain of the above described embodiments provide an artificial tooth having the lingual contour of a natural tooth, which is capable of being securely mounted in a denture and which may provide a natural lingual contour for the tooth and a natural gingival or palatal contour for the oral support in which the tooth is mounted and that certain of the above described embodiments provide an artificial tooth in which the hardness of the occlusal surface may be controlled to approximate the hardness of the occlusal surface of a natural tooth. It will also be apparent that a novel method of uniting an artificial tooth to a tooth support has been provided.

While I have generally stated in the foregoing description that the enamel simulating portion and the body portion of the tooth are made of ceramic material, they may be made of any other suitable rigid material known to persons skilled in the art such as an allyl casting resin (one trade name of which is "Kriston"—page 1363 of the 1946 edition of Modern Plastics Catalog) or a thermosetting resin (one trade name of which is "Bakelite"—page 1363 of the 1946 edition of Modern Plastics Catalog).

By "basal part" or "base" or "basal surface" of the tooth, I mean that part of the tooth which abuts the material of the oral support, that is to say, the gingival portion of the tooth, and as applied to any constituent element of the tooth, the term "base" or "basal" is intended to designate the part of said element which is nearest to the gingival end of the tooth as a whole. By "tooth support" I mean the oral support in which the tooth is mounted for use, e. g., a bridge or denture and by "material of the tooth support," I mean the material used to support the tooth in the bridge or plate. By "a hardened material capable by appropriate treatment of molecularly uniting with the material of the tooth support," I mean a material capable of being joined to the material of the tooth support by welding, interfusing, treatment with a solvent or the like wherein the contacting surfaces of the two materials are integrated at the zone of union and the particles of such surfaces intermingle and cohere to form an integral mass.

The embodiments of the invention illustrated in Figs. 9 to 18 inclusive illustrate artificial teeth wherein intercommunicating cells are located in the enamel simulating portion of the tooth for the visual effects produced. In these figures of the drawings the body portion or dentine simulating portion of the tooth is indicated generally by the numeral 20 and the enamel simulating portion is indicated generally by the numeral 22. The body portion 20 may be made of ceramic or other suitable material which may be secured to a denture base material or other oral support by means of a metallic pin 21 or by suitably located retention recesses (not shown), both well known in the art. It may also be attached by molecular union, in which case part at least of the base or gingival portion of the tooth may be of suitable material to thus unite with the oral support, for example one of the embodiments of Figs. 1 to 6 may be utilized for the gingival portion of the tooth. Any other suitable means for attaching the tooth to the oral support may be utilized.

This phase of the invention is not limited to anterior teeth, such a tooth merely being chosen for purposes of illustration in Figs. 9 to 18 of the drawings.

Referring to the tooth illustrated in Figs. 9 and 10 the enamel simulating portion 22 consists of a cell-forming material 23 (either transparent, translucent or opaque), honeycombed with communicating cells which are filled with a material 24 having different visual characteristics from the material 23. From the labial face and at very close range this tooth appears to be filled with tiny closely spaced dots. Where the cell-forming material 23 is ceramic, the cell-filling material 24 may be clear transparent or it may be slightly tinted to give a very subtle contrast to the cell-forming structure. For special effects the cell-filling material 24 may be transparent, opaque, white or of any desired color in certain areas and the cell-forming structure may be correspondingly varied.

The fine dots 24 are not readily observable or distinguishable from the cell-forming structure 23 except at very close ranges. But at the usual distances of observation such teeth have a visually heterogeneal stippled effect. Where the materials used are differently colored the effect is heterochromatic. Such a tooth surface appears less artificial and more natural than a tooth which is generally homogeneal or homochromatic.

The cell-filling material is preferably of such a nature that it will not adversely affect the strength of the tooth. For this purpose I prefer to use a synthetic resin, herein sometimes referred to as a plastic, such as methyl methacrylate, polystyrene or the like, although any suitable material may be used.

The cells are so shaped and arranged that they communicate with each other by openings or passages and those which are located at the surface of the enamel simulating portion have openings or passages communicating therewith. Thus the cell-forming material forms a continuous structure and the cell-filling material forms a substantially continuous structure and if the cell-forming structure is made of ceramic material the labial surface of the tooth may present a combination of plastic and ceramic materials which is a somewhat softer surface than a surface composed solely of ceramic material. Preferably a substantial number of the cells are retentive in form whereby the cell-filling material 24 is retained against displacement by walls of the cells.

When the cell-forming structure 23 is made of ceramic material a customary enamel forming ceramic mix is prepared and to it is added an organic filler, for example, grains of walnut wood, cork, small seeds or plastic powder, for example, polymers of methyl methacrylate or polystyrene may be used. Suitable proportions for methyl methacrylate are 50% by weight of the ceramic powder but these proportions may be varied over a substantial range. The ceramic powder being considerably finer than the particles of filler, the former substantially surrounds the latter upon thorough mixing except where the larger filler particles contact each other or the surfaces of the mould. I prefer to use plastic powder as a filler because it provides substantially spherical cells whereas the other materials provide cells which are more irregular in shape. By providing substantially spherical cells the cell-forming structure 23 is stronger.

To make the tooth of Figs. 9 and 10, when such a combination of ceramic and plastic materials are used, the above described mix is suitably placed in the labial cavity of a standard tooth mould, the appropriate ceramic dentine simulating mix is added and the tooth is biscuited by heat and pressure. The filler particles are then removed by burning during the customary firing operation or they may be dissolved out by the use of a suitable solvent, for example, acetone. After the filler particles have been removed the enamel-simulating portion 23 of the tooth is honeycombed with communicating retentive cells and a substantial number of the outer layer of cells communicate with the surface of said portion.

The plastic material 24 for filling the cells thus provided (for example methyl methacrylate, polystyrene or the like) may be injected into the cells by injection moulding methods as used in the injection moulding of plastics. Another method of filling the cells with plastic material is by the use of a vacuum chamber in which the teeth are placed, the air is evaculated from the cells, and the vacuum is then released while the teeth are immersed in a bath of the fluid plastic material. Upon releasing the vacuum, the plastic material is forced into the cells by atmospheric pressure. Additional pressure may be supplied if desired. The tooth is then removed from the bath, any excess fluid is wiped off and the plastic material is cured. Fig. 18 illustrates a cross section of the completed enamel simulating portion in which the cells are of generally spherical shape.

Although I prefer to manufacture and market the teeth with the material 24 incorporated in the cells as a permanent part of the tooth, the cells may be filled by the tooth manufacturer with a temporary, easily removable, filling, for example, wax which is readily removed, for example, by boiling in water or by dissolving in carbon tetrachloride. In such case, if desired, the dentist or the laboratory technician may first remove the wax from the cells in localized areas, and fill these cells with a plastic having certain visual characteristics, and he may then remove the wax from the remaining cells and fill them with a plastic having other visual characteristics. In this way each tooth may be made to simulate various characteristics of natural teeth. Either the above described injection method, the above described vacuum method or a compression moulding process may be used in filling the cells.

Another method of making the cells more pronounced in certain localities than in others is to use enamel forming mixes of different kinds and place them in different localities of the labial mould cavity during the packing process. For example, a mixture containing filler particles of very small size may be placed in some localities, a mixture containing filler particles of larger size may be placed in other localities and the customary enamel forming mix containing no filler may be placed in other localities of the enamel simulating portion of the tooth.

The tooth manufacturer as well as the dentist or dental technician may fill the cells in certain localities with cell-filling material 24 of one visual characteristic and the cells in another locality with cell-filling material of another visual characteristic by the wax or masking method described above. For example, in one locality they may be filled with a clear transparent plastic, in another with an opaque plastic and in another with a colored plastic.

The tooth illustrated in Figs. 11 and 13 is like the tooth illustrated in Figs. 9 and 10 except that the localities 23$^d$ are made of enamel forming mix and contain no cells.

In the tooth illustrated in Figs. 12 and 14 the body portion 20 is provided with a longitudinally extending insert portion 20$^a$, which is wedge shaped in cross section and which when viewed labially forms a crack or stain simulating line 20$^b$ as disclosed in my prior Patents 2,202,713 and 2,230,164. As shown in Fig. 12 the cells are formed in the incisal and in the mesial and distal portions of the tooth. This may be accomplished by packing the labial mould cavity in these localities with the organic filler ceramic mix and the remaining labial surface of said cavity with a ceramic enamel simulating mix. By using a suitable cell-filling material 24 and a suitable ceramic enamel simulating mix the tooth simulates the dark shadowy effect so frequently found at the incisal end and the adjacent lateral sides of natural teeth.

The cells are filled with any suitable material 24 by any of the methods described above.

Figure 1:

The tooth illustrated in Fig. 15 is like the tooth of Figs. 1 and 2 except that the cells do not extend throughout the thickness of the enamel-simulating portion. In the tooth of Fig. 15 the cells are located only in a layer adjacent to the labial surface of the tooth. This tooth may be made by any of the methods described for the tooth of Figs. 11, 12 and 18 except that only a thin layer of the ceramic organic filler mix is placed in the labial mould cavity and the remainder of the enamel-simulating portion 22 is supplied from the usual enamel forming mix 23.

The teeth illustrated in Figs. 16 and 17 differ from the tooth illustrated in Figs. 9 and 10, for example, in that the enamel-simulating portion 22 has a layer 23$^a$ formed without cells, said layer covering the labial face. When a relatively thin layer 23$^a$ is utilized the outermost dots 24 are close to the labial surface of the tooth and influence the visual effect of the tooth even in an enamel which is not transparent but is merely translucent. By varying the light transmitting properties of the layer 23$^a$ the stippled effect may be made as subtle as desired.

These teeth may be made by forming the enamel-simulating portion between two mould parts. If the cell-forming portion is to be of ceramic material a ceramic enamel-simulating mix is first laid down on the labial face part of the mould to the desired thickness and an organic filler mix is then added and the enamel-simulating portion thus formed biscuited. The organic filler may then be removed by solvents or during the process of firing as described above. The enamel-simulating portion thus formed with its communicating cells opening upon the lingual face may then be completed by a single step moulding process if the body portion 20 and the cell-filling material 24 are identical. If these materials differ the tooth may be completed in two stages, the first comprising filling the cells with cell-filling material 24 and the second comprising adding the body portion 20.

As stated above with respect to the embodiments of Figs. 1 to 8 inclusive the cell-forming portion 23 and the body portion 20 of the tooth are not necessarily made of ceramic material but they may be made of any other hard material such as an allyl casting resin or a thermosetting resin. Normally the cells are formed in a material which has a higher fusion or setting temperature than that of the material that fills the cells or the cell-forming portion may be thermosetting while the cell-filling material may be thermoplastic.

It will be apparent to persons skilled in the art that this invention may be utilized to produce an improved artificial tooth which permits closer simulation of the appearance of natural teeth than any artificial tooth heretofore made and such teeth embodying my invention may be manufactured by mass production methods.

It will be apparent to persons skilled in the art that facings, crowns and posterior teeth embodying this invention may readily be made by any of the disclosed methods and the term "artificial tooth" in the claims is to include them as well as anterior teeth of the type illustrated.

When I use the terms "labial face," "labial surface," and "labial layer" I mean the face, surface or layer of the tooth which is exposed to view when the tooth is in the patient's mouth. For example, these terms include the buccal face surface or layer of molars or bicuspids and also the occlusal face, surface or layer thereof.

Certain aspects of the methods of making artificial teeth disclosed herein are claimed in the copending application of Simon and Martin Myerson, Serial No. 748,304, filed May 15, 1947, and copending application of Simon and Richard L. Myerson, Serial No. 748,305, filed May 15, 1947.

While certain desirable embodiments of the invention have been illustrated by way of example, it is to be understood that the invention is not limited to these embodiments but is to be regarded as broadly inclusive of any and all equivalent constructions, as well as substitutions of material and changes in proportions of parts, such as fall within the scope of the appended claims.

I claim:

1. The method of uniting an artificial tooth to a tooth support which comprises providing the basal part of an artificial tooth with a multitude of intercommunicating cells, such intercommunication comprising passages between the walls of adjacent cells, some of said cells opening on the basal surface of the tooth, substantially filling said cells and passages with a material capable by appropriate treatment of molecularly uniting with the material of the tooth support, and causing the cell-filling material located at the basal surface of the tooth and the material of the tooth support to molecularly unite.

2. An artificial tooth as a completed article of manufacture comprising a rigid material provided with cells, a substantial number of said cells being intercommunicating, such intercommunication being provided by passages formed in said rigid material between the walls of adjacent cells and a hardened material having different characteristics than said rigid material substantially filling said cells and said passages.

3. The combination of claim 2 wherein the hardened material having different characteristics than the rigid material is a thermoplastic resinous material.

4. The combination of claim 2 wherein at least a substantial number of the cells are generally spherical in shape.

5. An artificial tooth as a completed article of manufacture comprising a rigid material provided with cells in the basal part of the tooth, a substantial number of said cells being intercommunicating, such intercommunication being provided by passages formed in said rigid material between the walls of adjacent cells, some of said cells opening on the basal surface of the tooth, and a hardened material substantially filling said cells and said passages and capable, by appropriate treatment, of molecularly uniting with the material of the tooth support.

6. The combination of claim 5 wherein the hardened material substantially filling the cells and passages is a thermoplastic resinous material.

7. The combination of claim 5 wherein the hardened material substantially filling the cells and passages is methyl methacrylate.

8. An artificial tooth as a completed article of manufacture comprising a rigid material provided with cells in the occlusal part of the tooth, a substantial number of said cells being intercommunicating, such intercommunication being provided by passages formed in said rigid material between the walls of adjacent cells, some of said cells opening on the occlusal surface of the tooth and a hardened material differing in hardness from said rigid material substantially filling said cells and said passages.

9. The combination of claim 8 wherein the rigid material is a ceramic material and the hardened material substantially filling the cells and passages is a thermoplastic resinous material which is softer than said ceramic material.

10. An artificial tooth as a completed article of manufacture comprising a rigid material provided with cells in the enamel simulating portion of the tooth, a substantial number of said cells being intercommunicating, such intercommunication being provided by passages formed in said rigid material between the walls of adjacent cells, and a hardened material having different characteristics than said rigid material substantially filling said cells and said passages.

11. The combination of claim 10 wherein at least a substantial number of the cells are generally spherical in shape.

12. The combination of claim 10 wherein the hardened material having different characteristics than the rigid material is a thermoplastic resinous material.

SIMON MYERSON.

REFERENCES CITED

The following references are of record in the file of this patent:

UNITED STATES PATENTS

| Number | Name | Date |
|---|---|---|
| 178,143 | Hall | May 30, 1876 |
| 448,745 | Wright | Mar. 24, 1891 |
| 638,019 | Justi | Nov. 28, 1899 |
| 696,099 | Hollingsworth | Mar. 12, 1902 |
| 1,367,477 | Homer | Feb. 1, 1921 |
| 1,384,282 | Tuttle | July 12, 1921 |
| 2,179,502 | Erdle | Nov. 14, 1939 |
| 2,419,084 | Myerson | Apr. 6, 1947 |

OTHER REFERENCES

Ser. No. 368,390, Czapp (A. P. C.) pub. July 13, 1943.